United States Patent
Lucas

(10) Patent No.: US 10,124,739 B2
(45) Date of Patent: Nov. 13, 2018

(54) INTEGRATED BICYCLE RACK ATTACHMENT FEATURE FOR REAR SPOILER

(71) Applicant: FORD GLOBAL TECHNOLOGIES, LLC, Dearborn, MI (US)

(72) Inventor: Marc Jonathon Lucas, Novi, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/069,419

(22) Filed: Mar. 14, 2016

(65) Prior Publication Data
US 2017/0259750 A1 Sep. 14, 2017

(51) Int. Cl.
  *B60R 9/06* (2006.01)
  *B60R 9/10* (2006.01)
  *B62D 35/00* (2006.01)

(52) U.S. Cl.
  CPC ................ *B60R 9/10* (2013.01); *B60R 9/06* (2013.01); *B62D 35/007* (2013.01)

(58) Field of Classification Search
  CPC .............. B60R 9/10; B60R 9/06; B60R 9/048
  USPC ..................................... 296/180.1
  See application file for complete search history.

(56) References Cited

U.S. PATENT DOCUMENTS

| | | | |
|---|---|---|---|
| 4,756,568 A * | 7/1988 | Yamamoto | B60S 1/0405 15/250.16 |
| 4,830,250 A | 5/1989 | Newbold et al. | |
| 5,476,201 A * | 12/1995 | Hall | B60R 9/10 224/309 |
| 5,495,970 A | 3/1996 | Pedrini | |
| 5,749,694 A * | 5/1998 | Ackerman | B60R 9/06 224/482 |
| 6,712,424 B2 | 3/2004 | Swain | |
| 8,020,247 B2 * | 9/2011 | Katou | B60S 1/0402 15/250.001 |
| 9,902,437 B2 * | 2/2018 | Demange | B62D 35/007 |
| 2005/0082324 A1 | 4/2005 | Schlachter | |
| 2014/0125045 A1 | 5/2014 | Nusbaum | |
| 2015/0076858 A1 * | 3/2015 | Godin | B62D 35/001 296/180.1 |

FOREIGN PATENT DOCUMENTS

| | | |
|---|---|---|
| DE | 19933435 A1 | 1/2001 |
| DE | 10009971 A1 * | 9/2001 ............... B60R 9/06 |

OTHER PUBLICATIONS

English machine translation of DE19933435A1.

* cited by examiner

*Primary Examiner* — Pinel E Romain
(74) *Attorney, Agent, or Firm* — Jason Rogers; King & Schickli PLLC

(57) ABSTRACT

A bicycle carrier attachment for a vehicle includes at least one bracket held within an interior of a vehicle spoiler. The at least one bracket is attached to a portion of the vehicle and held within the spoiler interior. Optionally, a cover is included that defines a flush surface with the spoiler body when in a closed configuration.

19 Claims, 5 Drawing Sheets

INTEGRATED BICYCLE RACK ATTACHMENT FEATURE FOR REAR SPOILER

TECHNICAL FIELD

This disclosure relates generally to accessory racks for motor vehicles, and more particularly to an integrated attachment feature for attaching a bicycle rack to a portion of a vehicle.

BACKGROUND

A variety of exterior bicycle carriers are commercially available, including roof-mounted carriers, rear hatch or trunk-mounted carriers, vacuum-mounted carriers, and hitch-mounted carriers. Each is substantially effective for its intended purpose. Certain rear hatch or trunk-mounted carriers are typically attached to a portion of a vehicle by one or more tensionable straps. However, certain engineering challenges are presented when attaching such rear-mounted carriers to vehicles equipped with a rear spoiler.

With reference to FIG. 1, a vehicle 100 including a rear closure 102 and an adjacent rear spoiler 104 are shown. A representative rear-mounted bicycle carrier 106 is also shown, including a bicycle support arm 108 and a vehicle-contacting arm 110. In the depicted embodiment, the vehicle-contacting support arm 110 rests upon the rear closure 102 at two points, although alternative configurations are well known. The carrier 106 also includes one or more tensionable straps 112, attached at a first end to the vehicle-contacting arm 110 (or other portion of the carrier 106) and at a second end to the vehicle, such as by a clip or hook 114 secured to a portion of the vehicle 100 sheet metal. The one or more tensionable straps 112 are then tightened by any of a number of suitable mechanisms, urging the carrier 106 against the rear closure 102. Example tensioning mechanisms well-known in the art include without intending any limitation ratchet systems, sliding clips, and the like.

While substantially effective, this type of attachment system causes problems unique to vehicles 100 equipped with rear spoilers 104 as shown in the drawing figure. The strap 112 contacts the spoiler 104 along a top surface and edge 114, and on tightening strap 112 a force is applied to the spoiler 104 at least at those areas. Conventionally, spoilers 104 are fabricated of plastics, polymers, or other flexible materials, and so the application of force attendant to tightening the straps 112 tends to deflect and deform the spoiler. This is exacerbated by the weight of one or more bicycles (not shown) attached to the carrier 106, the weight of which applies a downward force (arrow A). Moreover, because of the plasticity/flexibility of the spoiler 104, the straps 112 cannot be tightened sufficiently to prevent any movement, and so the carrier 106 tends to shift in a vehicle fore-and-aft direction (arrow B). This causes the carrier 106 to repeatedly displace from and return to contact with the rear closure 102, potentially resulting in cosmetic or more severe damage.

To solve these and other problems, the present disclosure relates to a bicycle carrier attachment system for a vehicle equipped with a rear spoiler. Advantageously, the described system allows attachment of bicycle carriers by way of tensionable straps, without the disadvantages attendant to conventional bicycle carriers as summarized above.

SUMMARY

In accordance with the purposes and benefits described herein, in one aspect a bicycle carrier attachment for a vehicle is described, comprising at least one bracket held within an interior of a vehicle spoiler. The at least one bracket may be attached to a portion of the vehicle and held within the spoiler interior. The spoiler body may optionally include a cover defining a flush surface with the spoiler body when in a closed configuration. In embodiments, the cover pivots to an open configuration. In other embodiments, the cover slidably translates to an open configuration, and may slidably translate either vehicle-inwardly or vehicle-outwardly.

In another aspect, a vehicle is provided including a cargo area having a rear closure and a spoiler adjacent to the rear closure. At least one bracket as described above is provided, held within an interior of the spoiler. The spoiler may include a translatable cover as described above.

In yet another aspect, a spoiler for a vehicle is described, including at least one recess allowing access to an interior of a spoiler body. As will be appreciated, this allows access to an attachment as described above. The spoiler may in embodiments include a translatable cover as described above.

In the following description, there are shown and described embodiments of the disclosed bicycle carrier attachment system. As it should be realized, the described devices are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed bicycle carrier attachment system, and together with the description serve to explain certain principles thereof. In the drawing.

Reference will now be made in detail to embodiments of the disclosed bicycle carrier attachment system, examples of which are illustrated in the accompanying drawing figures.

DETAILED DESCRIPTION

Preliminarily, the present disclosure primarily describes a bicycle carrier attachment system used in association with vehicle including a rear liftgate closure. However, the skilled artisan will appreciate that the described system is readily adaptable to any vehicle having a rear spoiler adjacent a rear closure for a cargo area, such as an SUV, a CUV, a van, a pickup truck, or even a vehicle having a trunk equipped with a spoiler. Accordingly, the descriptions and drawings that follow will not be taken as limiting in regard to the above-described features.

Figure 1:
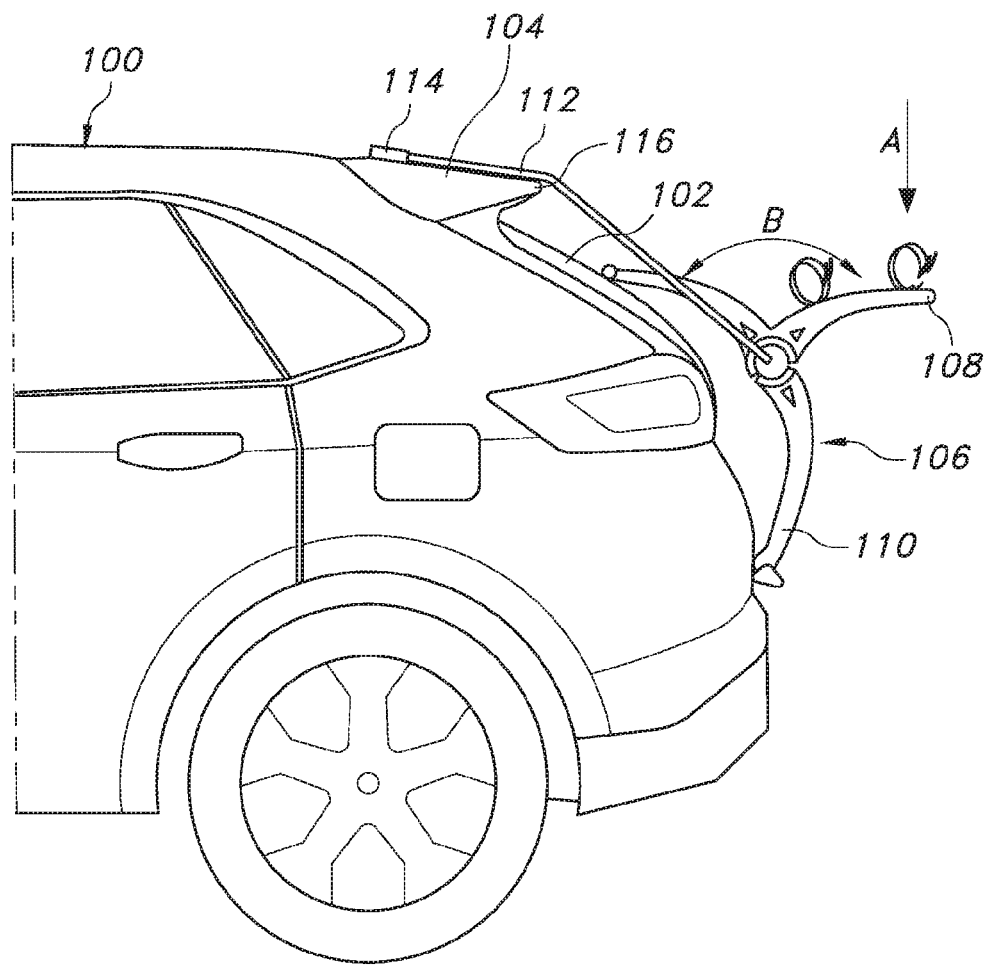
FIG. 1 depicts a vehicle including a prior art bicycle carrier.
Figure 2:
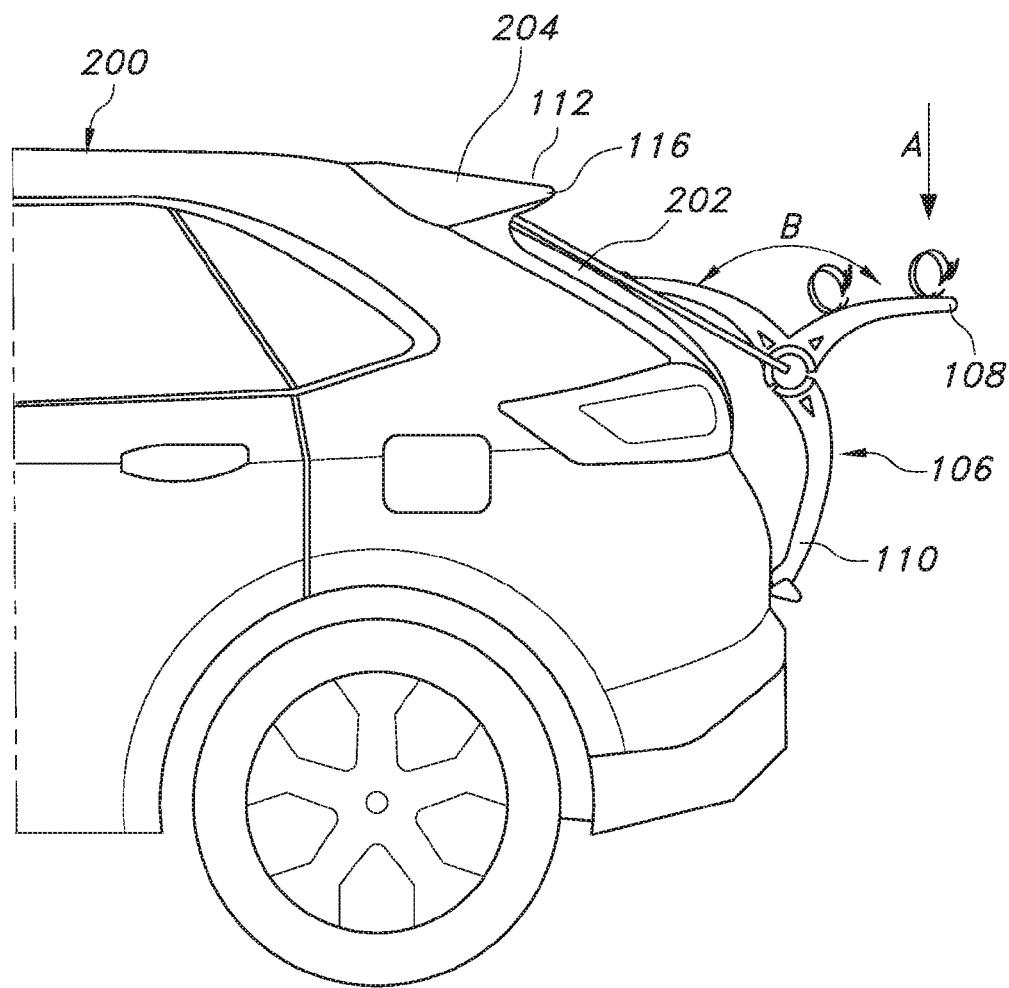
FIG. 2 depicts a vehicle equipped with a bicycle carrier attachment system according to the present disclosure.

FIG. 2 depicts a vehicle 200 including a rear closure 202 for a cargo area and a rear spoiler 204. A bicycle carrier 106 substantially as described in FIG. 1 is attached to the vehicle by one or more straps 112 (only one strap 112 is visible in the drawing view). At a high level, the disclosed bicycle carrier attachment system allows routing the strap 112 below the rear spoiler 204, thus eliminating the disadvantages summarized above. Because the present bicycle carrier attachment system allows routing the straps 112 below the spoiler 204 rather than above it, the straps 112 may be tightened sufficiently to reduce or eliminate the vehicle fore-and-aft movement of the carrier 106 attendant to the system shown in FIG. 1.

Figure 3A:
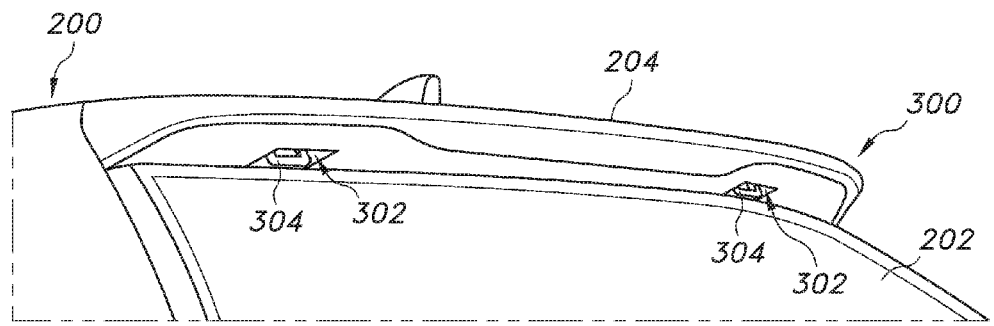
FIG. 3A shows a rear perspective view of the system of FIG. 2.
Figure 3B:
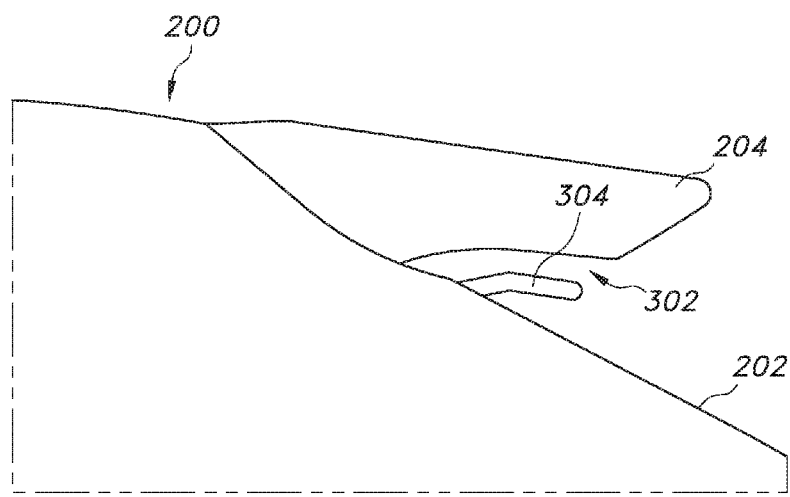
FIG. 3B shows a cross-sectional side view of the system shown in FIG. 3A.

In more detail and with reference to FIG. 3A, to provide the described advantages a bicycle carrier attachment system 300 is provided, comprising a rear spoiler 204 including at least one recess 302 defined in the spoiler body, the at least one recess allowing access to a portion of an interior of the spoiler body. Bicycle carrier attachment points defined by one or more brackets 304 are attached to a portion of the vehicle 200 whereby the brackets are held at least partially within the spoiler 204 interior (see FIG. 3B). The brackets 304 may be simple b-rings, hooks, or may be more complex bracket structures. As shown in FIG. 3B, the brackets 304 are secured directly to a portion of the vehicle 200, for example to a portion of a roof panel or an upper portion of the rear closure 202, such that any need for routing straps 112 (not shown) over a top portion of the spoiler 204 is obviated.

Figure 4A:
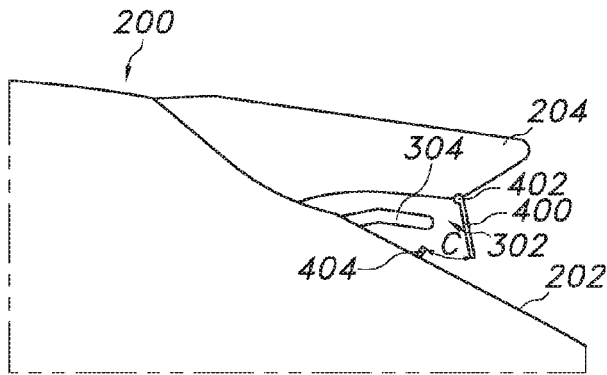
FIG. 4A depicts an embodiment of a cover for a recess defined in a rear spoiler according to the present disclosure.
Figure 4B:
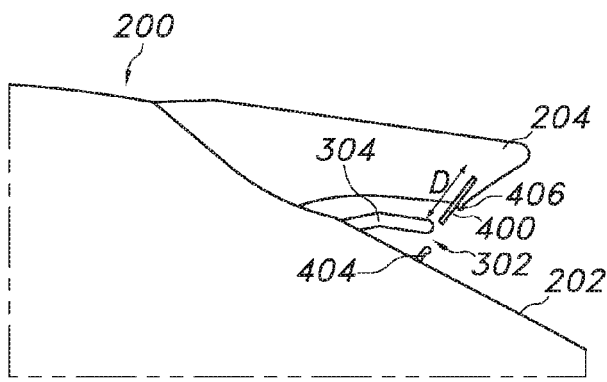
FIG. 4B depicts an alternative embodiment of the cover of FIG. 4A.
Figure 4D:
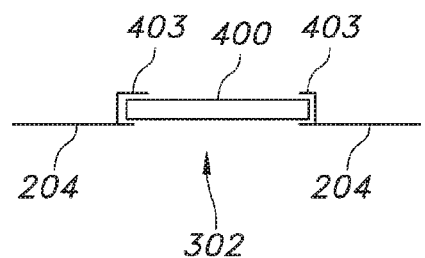
FIG. 4D depicts a sliding track for the cover embodiments of FIGS. 4B and 4C.
Figure 4C:
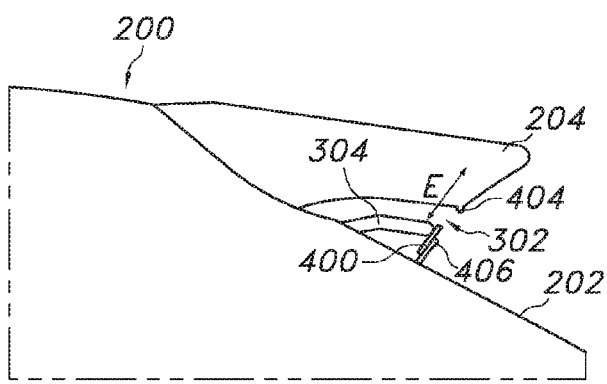
FIG. 4C depicts an alternative embodiment of the cover of FIG. 4B.

An optional cover 400 (see FIGS. 4A-4C) may be included to cover recesses 302 when a bicycle carrier is not attached to the vehicle 200. The cover 400 may be configured to hingedly pivot (FIG. 4A) between an open and a closed configuration (arrow C). Any suitable hinge structure 402 is contemplated. Likewise any suitable latching mechanism 404 is contemplated for holding the cover 400 in the closed configuration, including without intending any limitation snap-fit, friction-fit, or interference-fit latches. In the closed configuration, the cover 400 defines a substantially flush surface to the body of the spoiler 204, thus providing an attractive exterior appearance favorably received by a consumer when the bicycle carrier attachment system is not in use.

In alternative embodiments (FIGS. 4B and 4C), the cover 400 may be configured to slidingly translate in a vehicle outward/vehicle inward direction between an open and a closed configuration. The covers 400 may be configured to slidingly translate by any suitable mechanism, for example by providing cooperating tracks 403 adjacent to recess 302 (see FIG. 4D) in which the edges of covers 400 are received and can slide. Again, any suitable latching mechanisms 404, 406 are contemplated for respectively retaining the cover 400 in the open or closed configuration, including without intending any limitation snap-fit, friction-fit, or interference-fit latches.

Accordingly, the foregoing description provides an efficient and effective attachment system for attaching a bicycle carrier to a rear portion of a vehicle equipped with a rear spoiler by way of one or more tensionable straps. Advantageously, the described system allows applying a suitable tensioning force to such straps, without causing flexing/displacement of the rear spoiler and attendant loose fit and potential damage to the vehicle.

Figure 5A:
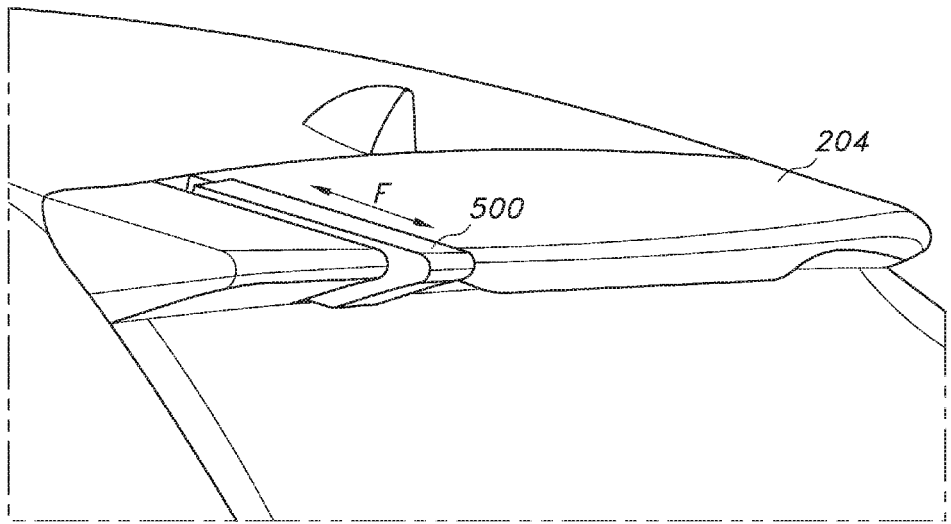
FIG. 5A depicts an alternative embodiment of the cover of FIG. 4A.
Figure 5B:
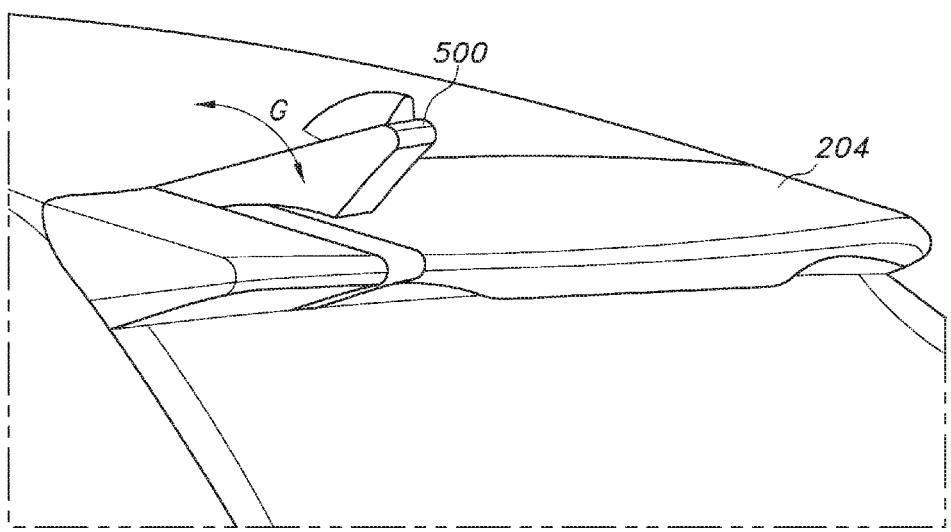
FIG. 5B depicts an alternative embodiment of the covers of FIGS. 4B and 4C.

Obvious modifications and variations are possible in light of the above teachings. For example, as shown in FIGS. 5A and 5B, larger covers 500 configured for pivoting or sliding translation between an open and a closed configuration (arrows F and G, respectively) may be provided. As shown in these figures, the covers 500 may define larger sections of the spoiler 204 body. The covers 500 may be kept associated with the spoiler 204 structure, or may be fully removed for attachment of a bicycle carrier and re-attached after the carrier is removed. All such modifications and variations are within the scope of the appended claims when interpreted in accordance with the breadth to which they are fairly, legally and equitably entitled.

What is claimed:

1. A bicycle carrier attachment for a vehicle, comprising at least one bracket held within an interior of a vehicle spoiler, wherein the at least one bracket is attached to a portion of the vehicle and held within the spoiler interior.

2. The attachment of claim 1, further including a cover defining a flush surface with the spoiler body when in a closed configuration.

3. The attachment of claim 2, wherein the cover pivots to an open configuration.

4. The attachment of claim 2, wherein the cover slidably translates to an open configuration.

5. The attachment of claim 4, wherein the cover slidably translates vehicle-inwardly.

6. The attachment of claim 4, wherein the cover slidably translates vehicle-outwardly.

7. A motor vehicle including the attachment of claim 1.

8. A vehicle, comprising:
a cargo area having a rear closure;
a spoiler adjacent to the rear closure; and
a bicycle carrier attachment including at least one bracket held within an interior of the spoiler.

9. The attachment of claim 8, wherein the at least one bracket is attached to a portion of the vehicle and held within the spoiler interior.

10. The attachment of claim 9, further including a cover defining a flush surface with the spoiler body when in a closed configuration.

11. The attachment of claim 10, wherein the cover pivots to an open configuration.

12. The attachment of claim 10, wherein the cover slidably translates to an open configuration.

13. The attachment of claim 12, wherein the cover slidably translates vehicle-inwardly.

14. The attachment of claim 12, wherein the cover slidably translates vehicle-outwardly.

15. A vehicle spoiler, comprising at least one recess allowing access to an interior of a spoiler body; and
an attachment point for a bicycle carrier, the attachment point being defined by a bracket held within the at least one recess.

16. The spoiler of claim 15, further including a translatable cover defining a flush surface with the spoiler body when in a closed configuration.

17. The spoiler of claim 16, wherein the cover pivots to an open configuration.

18. The spoiler of claim 16, wherein the cover slidably translates vehicle-inwardly or vehicle-outwardly to an open configuration.

19. A motor vehicle including the spoiler of claim 15.

* * * * *